United States Patent [19]

Frame

[11] Patent Number: 4,620,107

[45] Date of Patent: Oct. 28, 1986

[54] COMPENSATED LIGHT PEN WITH VARIABLE ATTENUATOR

[75] Inventor: Gary E. Frame, Reseda, Calif.

[73] Assignee: Liprad Associates, Hanford, Calif.

[21] Appl. No.: 649,061

[22] Filed: Sep. 10, 1984

[51] Int. Cl.$^4$ .......................... G09G 3/02; G06K 7/10
[52] U.S. Cl. ..................................... 250/566; 340/707
[58] Field of Search ............... 340/707, 708; 250/227, 250/214, 566, 568; 235/471, 472

[56] References Cited

U.S. PATENT DOCUMENTS 3,852,721  12/1974  Tucker et al. ...................... 340/707
4,451,895  5/1984  Sliwkowski .......................... 340/707

Primary Examiner—David C. Nelms
Assistant Examiner—William L. Oen
Attorney, Agent, or Firm—Charles H. Schwartz; Ellsworth R. Roston

[57] ABSTRACT

An automatically compensated light pen for use with a video display monitor incorporating a cathode ray tube, including, a detector for detecting light pulses produced by the cathode ray tube when the detector is positioned adjacent the cathode ray tube at a particular desired location and for producing electrical pulses in accordance with the light pulses, a variable attenuator having a first input coupled to the output of the detector and responsive to the electrical pulses from the detector for producing variably attenuated electrical pulses and having a second control input responsive to a control signal for controlling the level of the variably attenuated electrical pulses, a threshold comparator coupled to the output of the variable attenuator and responsive to the variably attenuated electrical pulses for producing output electrical pulses when the level of the variably attenuated electrical pulses are higher than a particular threshold level for the threshold comparator, and a peak detector coupled between the output of the variable comparator and the control input of the variable attenuator and responsive to the variably attenuated electrical pulses for producing a control signal coupled to the control input of the variable attenuator when the level of the variably attenuated electrical pulses are higher than a particular peak level for the peak detector and with the particular threshold level for the threshold comparator less than the particular peak level for the peak detector.

20 Claims, 17 Drawing Figures

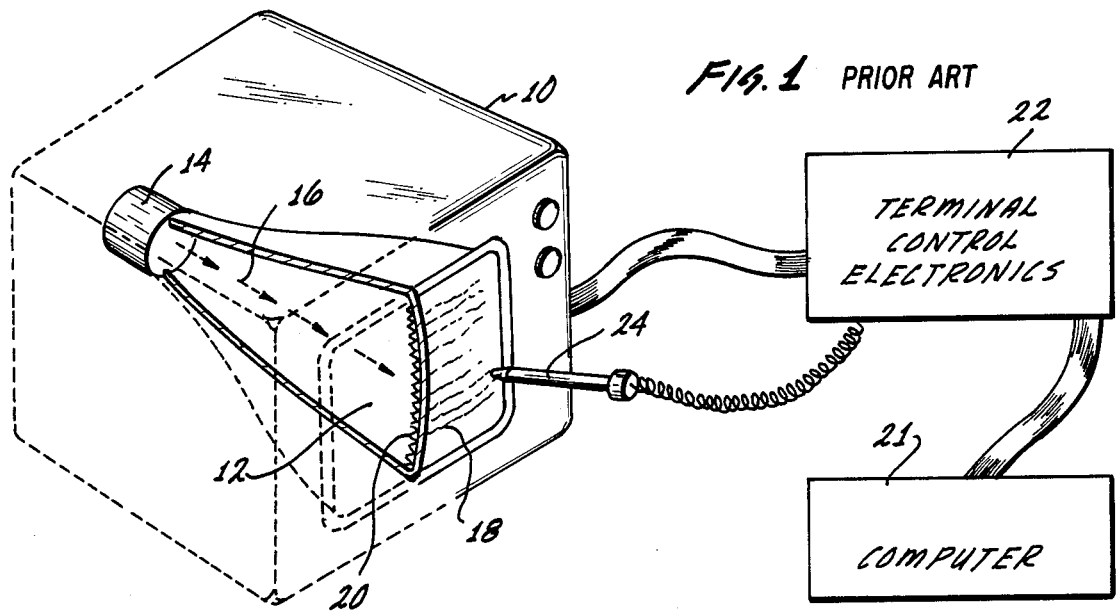
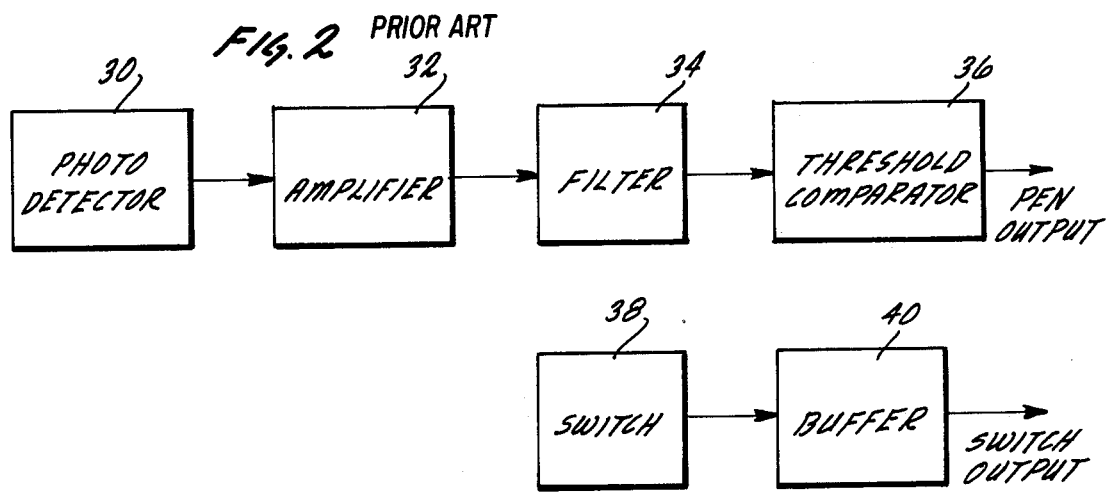
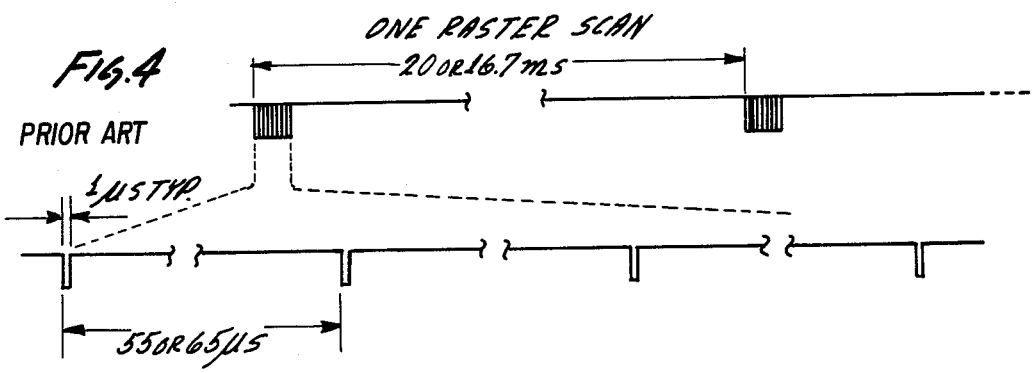

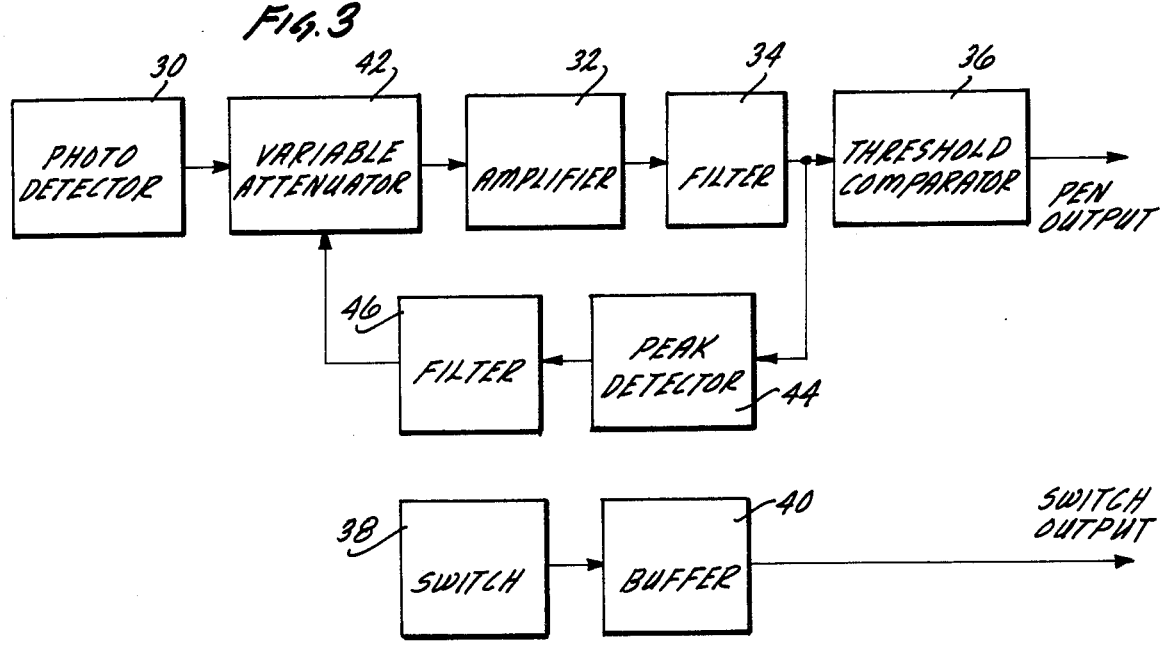
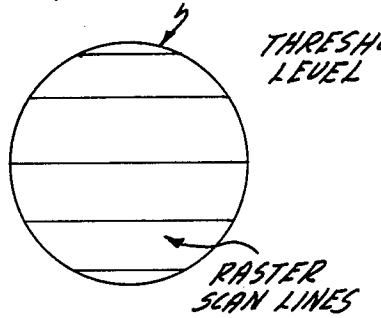
Fig. 5a
PRIOR ART
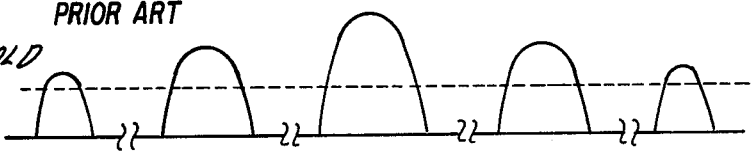
Fig. 5b CORRESPONDING PULSES AT POINT (24)
PRIOR ART
Fig. 5c PEN OUTPUT PULSES
PRIOR ART
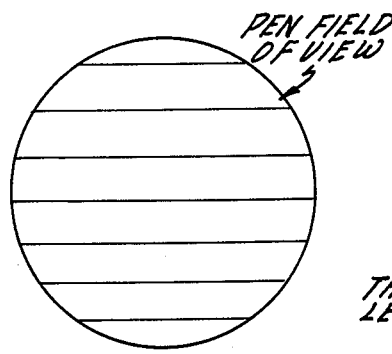
Fig. 6a
PRIOR ART
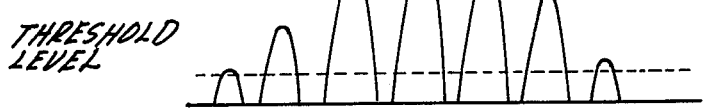
Fig. 6b CORRESPONDING PULSES AT POINT (24)
PRIOR ART

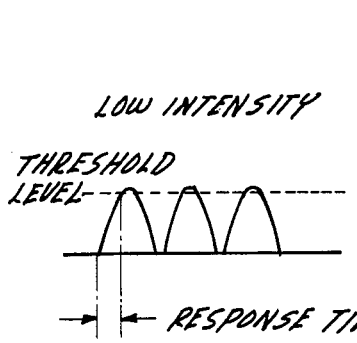
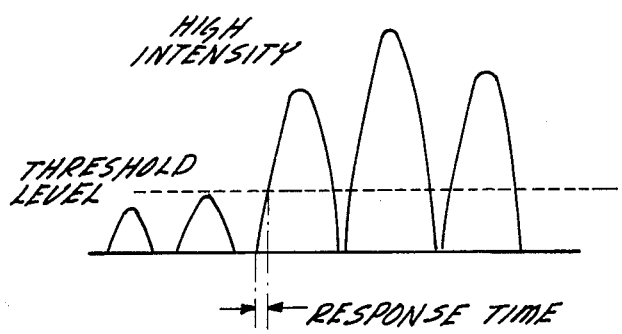
Fig. 7a PULSES AT POINT (24)
PRIOR ART
Fig. 7b PULSES AT POINT (24)
PRIOR ART
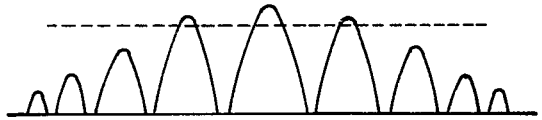
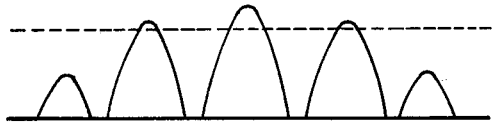
LARGE FIELD OF VIEW AT LOW INTENSITY (AWAY FROM SCREEN)
Fig. 8a
SMALL FIELD OF VIEW AT HIGH INTENSITY (CLOSE TO SCREEN)
Fig. 8b
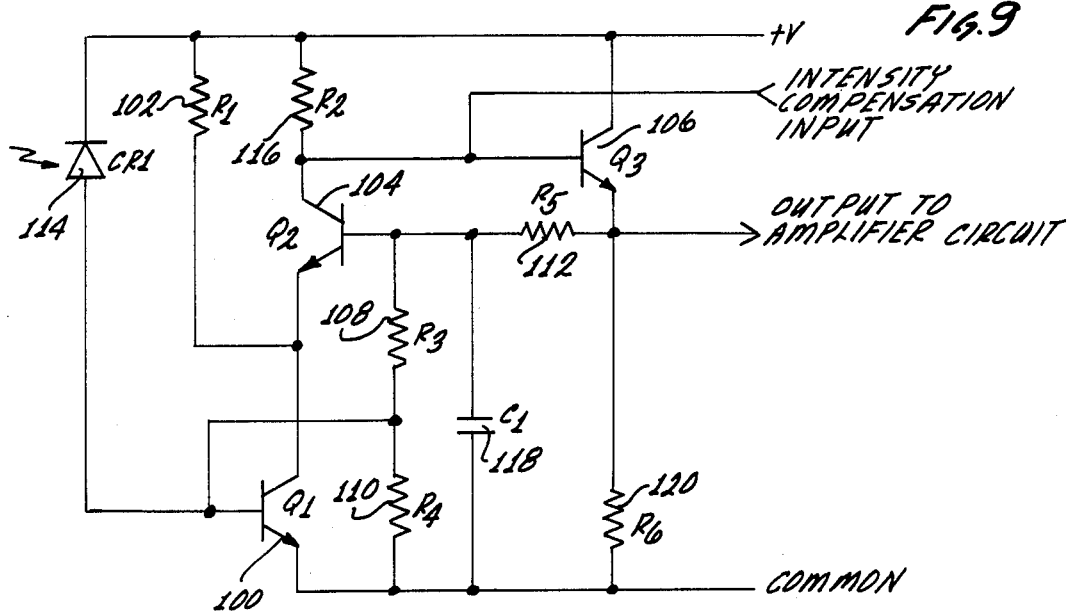
Fig. 9

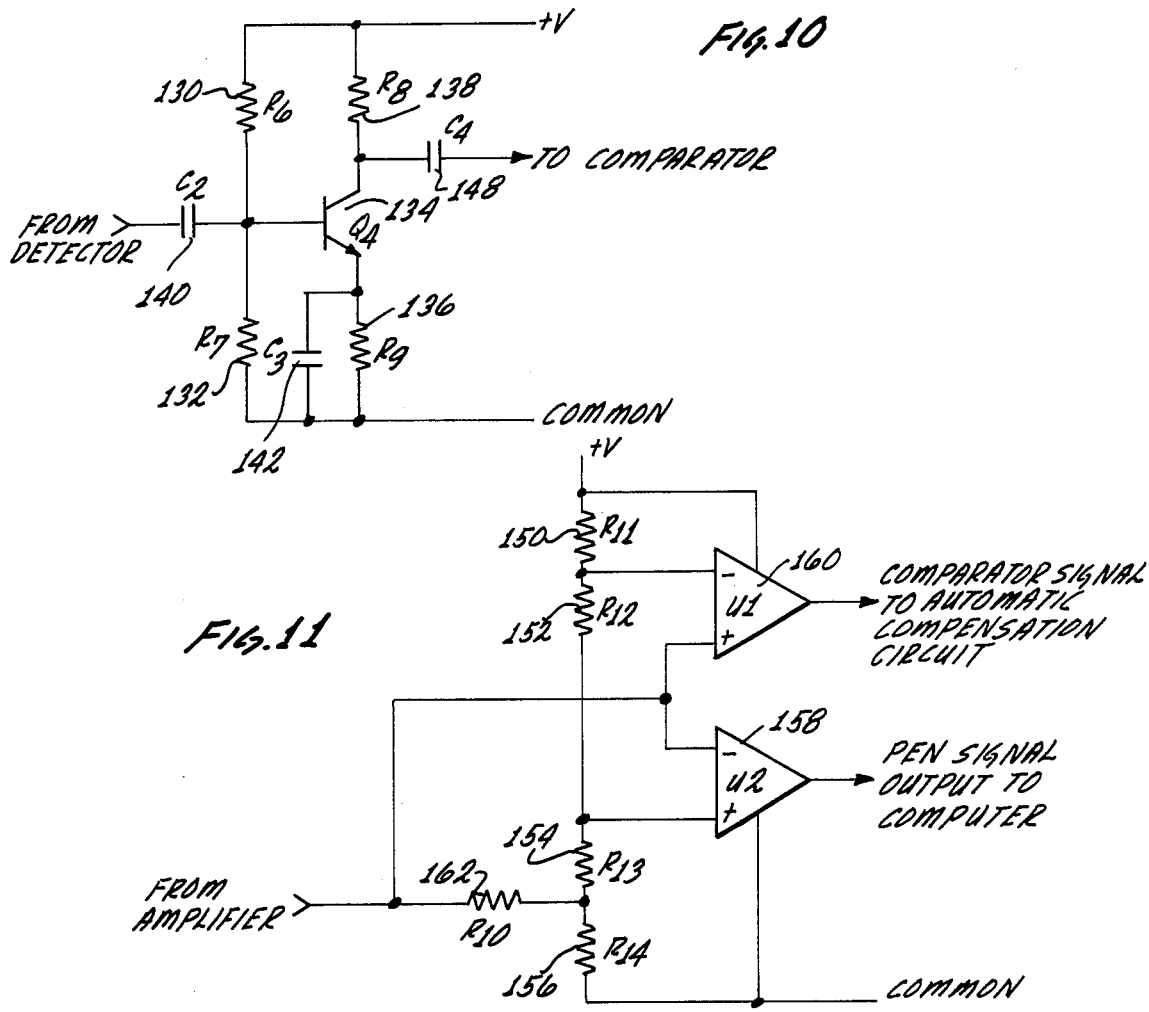
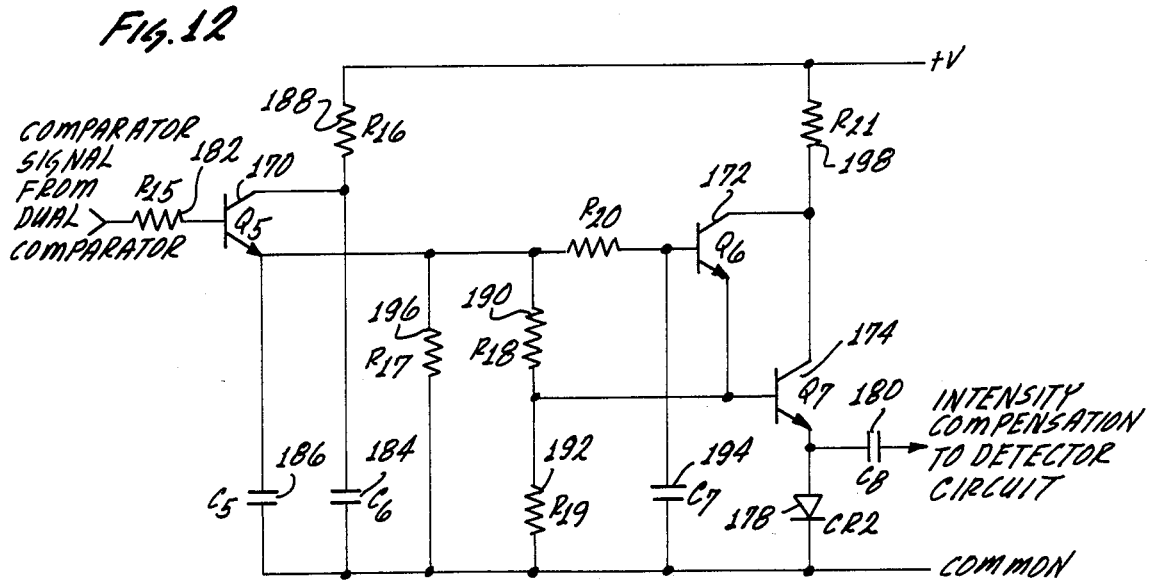

COMPENSATED LIGHT PEN WITH VARIABLE ATTENUATOR

BACKGROUND OF THE INVENTION

1. Field of the Invention

The present invention relates to a light pen for use with a cathode ray tube (CRT) forming part of a video display terminal. Specifically, the present invention relates to a compensated light pen that will work without adjustment with substantially all presently used CRTs used in video display terminals.

2. Description of the Prior Art

Light pens in general have a configuration similar to that of a writing pen. However, the light pen uses the light emitting from the cathode ray tube as the communication media between a computer system which incorporates the video display and the operator of such computer system.

The light pen itself does not write with light on the CRT screen of the video display but rather the light pen detects light pulses from the CRT to thereby produce electrical pulses in response to the light pulses. The CRT typically presents information to the viewer by directing an internal beam of electrons to a phosphorescent coating on the rear surface of a glass viewing screen. As the beam of electrons strikes the phosphorescent surface at any particular point, light energy is created on the screen at that point. The electron beam is typically scanned across the entire viewing surface as a series of horizontal lines designated as a raster, so that ultimately the entire internal surface of the CRT screen receives electron beam energy. The beam and its resultant spot of light is continually moving so that at any particular point the light energy is produced for only a very brief period of time.

Ideally, the light pen, when positioned at the desired spot adjacent the CRT screen, would produce a single pulse when the point of light was directly in front of the pen. Also ideally, this single pulse would be independent of the phosphor type for the screen and the light intensity at the particular point. However, the light pen systems currently in use have a number of specific limitations since the light pen has a field of view that encompasses several horizontal lines of the electronic beam raster. Therefore, the output from the light pen is not a single pulse but is typically a series of pulses. Also the apparent field of view for the light pen varies with the light intensity from the CRT. Further, the actual field of the view of the light pen depends on the distance from the pen to the actual phosphor layer for the CRT. In addition, the edges of the field of view for the light pen are not well defined so that the pulses tend to fall off to either side of the series of pulses rather than being sharply attenuated. Finally, since the light pen is actually detecting light intensity pulses, the response time of the pen varies with the intensity of light from the CRT and the distance between the pen and the CRT and each pen must thereby have its sensitivity adjusted according to the intended usage for the pen.

In addition to the above described deficencies with prior art light pens, it should also be noted that there are a number of physical factors which affect the overall light pen design. Specifically, the ratio of the light intensity between a television screen at full brightness and at minimum usable brightness for a typical phosphor is greater than twenty thousand to one (20,000/1). This ratio is typically beyond the usable dynamic range of a silicon photo conductor. The CRT also radiates a strong electrostatic field which must be shielded from the sensitive photodetector circuit. This shielding thereby limits the minimum distance of the detector to the face of the CRT. In addition, the phosphor is on the inside of the glass screen and glass thickness varies with the type of display and with the position on the viewing surface. Therefore, the minimum distance from the end of the pen to the phosphor surface on the inside of the glass is not constant so that the field of vies varies as the tip of the pen is moved across the surface of the CRT.

SUMMARY OF THE INVENTION

The present invention provides for a light pen that works without adjustment on substantially all phosphors commonly used today in CRTs. Moreover, not only does the pen adapt to substantially all CRT phosphors, it eliminates a large number of the problems described above. In particular, the light pen of the present invention provides for an automatic intensity compensation so as to minimize the number of pulses in the output from the light pen, reduce the apparent and actual fields of view, even with changes in CRT intensity or variations in distance from the pen to the CRT phosphor, sharpen the edges of the field of view and provide a more constant response time even with variations in CRT intensity and distance between the pen and the CRT. In addition, this is accomplished without having to adjust for the sensitivity of each pen according to its intended use since the automatic intensity compensation automatically provides for such adjustment.

The automatic intensity compensation is provided by the additional use of a variable attenuator in series with the output signal from the photodetector and with a parallel feedback path incorporating a peak detector so as to control the variable attenuator to provide for an automatic compensation of the intensity of the output from the light pen.

BRIEF DESCRIPTION OF THE DRAWINGS

A clearer understanding of the present invention will be had with reference to the following description and drawings wherein;

FIG. 1 illustrates a light pen system for use with a video display incorporating a cathode ray tube;

FIG. 2 is a block diagram of a prior art light pen;

FIG. 3 is a block diagram of a compensated light pen incorporating the present invention;

FIG. 4 illustrates the typical output burst from the light pen;

FIGS. 5(a), (b) and (c) illustrates an actual burst of pulses from the light pen in accordance with a particular pen field of view;

FIGS. 6(a) and (b) illustrate the effect on the output pulses due to a high intensity display;

FIGS. 7(a) and (b) illustrate the variation in response time due to variation in light intensity from the CRT;

FIGS. 8(a) and (b) illustrate compensated wave forms produced by the light pen of the present invention for two (2) extreme conditions;

FIG. 9 illustrates the detector circuitry for a particular embodiment of the invention;

FIG. 10 illustrates the amplifier circuitry for a particular embodiment of the invention;

FIG. 11 illustrates the comparator circuitry for a particular embodiment of the invention; and FIG. 12 illustrates the particular circuitry for the automatic compensation circuit of the present invention.

DESCRIPTION OF THE PREFERRED EMBODIMENT

In general, the elements forming a typical light pen system, as shown in FIG. 1, include a video display terminal 10 incorporating a CRT tube 12. The CRT tube 12 includes an electron gun 14 which produces an electron beam 16 for scanning within the tube 12. The inner front face 18 of the CRT tube 12 includes a phosphor coating 20 which phosphor 20 coating, when excited by the electron beam 16, produces light energy.

A computer 21 may be associated with the video display 10. Specifically, terminal control electronics 22 interconnect the computer 21 with the video display 10 to provide for the proper video display on the surface of the CRT tube 12 in accordance with signals from the computer 20. A light pen 24 may be incorporated in the system by connecting the light pen to the terminal control electronics 22. Specifically, the light pen allows the computer operator to select a specific spot on the video display 10 by pointing to the spot with the light pen 24. The light pen thereby detects light pulses from the surface of the CRT 12 and produces electrical output pulses in response to the detected light. These electrical output pulses are then fed through the terminal control electronics 22 to the computer so that the light pen may be used as part of the complete computer video display system.

As shown in FIG. 2, the typical light pen includes a photodetector 30 which receives the light pulses from the selected area of the CRT 12 and produces low level current pulses in response to the detected light. An amplifier 32 converts the low level current pulses from the photodetector 30 into higher level voltage pulses at the output of the amplifier. A filter 34 is used to remove low frequency signals such as the fifty (50) or sixty (60) hertz light flicker from the CRT screen and also any low frequency variations caused by the operator moving the pen. The output from the filter is applied to a threshold comparator 36 which threshold comparator produces an output voltage pulse for each voltage pulse from the filter 34 that is greater than a preselected amplitude.

Typically, the light pen 24 does not operate to validate output pulses to the computer unless specifically activated, such as by a switch 38. The switch 38 may actually be a button incorporated in the body of the light pen 24 or the tip of the light pen 24 may be designed so that the tip forms part of the switch and the switch cannot be activated unless the pen tip is pressed against the CRT 12. When the switch 38 is activated, this provides a signal to the buffer 40 and with the output of the buffer providing a signal to the computer to indicate that the pen is in the proper position and that the output signal from the pen is valid.

FIG. 3 illustrates a block diagram for a compensated light pen constructed in accordance with the teachings of the present invention. Portions of the system which are essentially the same as shown in FIG. 2 are given the same reference characters. In particular, the photodetector 30 receives light pulses from the selected area of the screen and produces low level current pulses. The output from the photodetector is passed through a variable attenuator 42 to control the current level of the pulses from the photodetector 30. The amplifier 32 converts the low level current pulses to higher level voltage pulses and with the filter 34 removing low frequency signals such as any fifty (50) or sixty (60) hertz light flicker or any low frequency variations caused by moving the pen.

A peak detector 44 produces a signal whenever the voltage at the output of the filter 34 is greater than a predetermined value. A filter 46 converts the signal from the peak detector 44 into a voltage which is used to control the variable attentuator 42. The peak detector 44 and filter 46 thereby form a feedback path to control the variable attentuator 42 so that the peak voltage at the output of the filter 34 is constant even though the intensity of the light pulses detected by the photodetector 30 varies over a considerable range. The provision of a relatively constant signal to the threshold comparator 36 thereby reduces significantly the problems encountered by prior art light pens.

FIG. 4 illustrates in general, the output signals from the light pen system of FIGS. 2 or 3. Specifically, the photodetector 30 produces an output pulse whenever the electron beam 16 is exciting phosphors in the phosphor coating 20 of the CRT 12. Since several scan lines are normally within the field of view of the light pen, the voltage at the output of the filter 34 is a burst of pulses each about one (1) microsecond wide and with approximately fifty-five (55) or sixty-five (65) microseconds between pulses. The burst of pulses occur at a burst rate of fifty (50) or sixty (60) hertz per second.

As shown in FIG. 4, each raster scan is approximately 20 milliseconds or 16.7 milliseconds and with the burst of pulses thereby approximately 20 milliseconds or 16.7 milliseconds apart. The number of pulses in each burst depends on the number of raster scan lines in the field of view of the light pen and with the width of the burst of pulses being a minimum of fifty-five (55) or sixty-five (65) microseconds and ranging up to five hundred (500) microseconds. Again typically, each pulse may be approximately one (1) microsecond wide and with approximately fifty-five (55) or sixty-five (65) microseconds between pulses.

FIGS. 5(a), (b) and (c) illustrate how the amplitude of the pulses in the burst increase and decrease in a bell shaped pattern and with the actual amplitude of each pulse determined by the intensity of the CRT display, the rise time of the phosphor and the distance between the CRT and the photodetector in the light pen.

FIGS. 6(a) and (b) illustrate the effect of a high intensity for the display affect the output pulses. When the display intensity is high, scan lines further from the center of the detector still have enough light intensity to produce pulses which would trigger the comparator 36. It can be seen when comparing FIG. 6(a) with FIG. 5(a) that the effective field of view of the light pen varies in accordance with the intensity of the light at the CRT display.

FIGS. 7(a) and (b) illustrate the variation in response time between the onset of a pulse and the detection by the threshold comparator 36 because of intensity variations of the pulses. Specifically as shown in FIG. 7(b) high intensity pulses cause a large amplitude signal into the comparator 36 which in turn causes the comparator to change its state earlier. This response time may be compared with a slower response time caused by a low intensity pulse as shown in FIG. 7(a).

The use of the compensated light pen system as shown in FIG. 3 provides for the substantial elimination of the various problems shown with reference to FIGS.

5(a), (b) and (c), 6(a) and (b) and 7(a) and (b). As as example, two (2) extreme conditions are shown in FIGS. 8(a) and (b) wherein the compensation circuit of FIG. 3 provides for an elimination of of the effect of extreme conditions on the output pulses. For example, FIG. 8(a) illustrates the compensated output pulses produced even with a large field of view for the light pen, such such as when the pen is away from the screen, and with this large field of view normally at low intensity. The compensation circuit essentially eliminates the burst signals to the side of the three (3) center pulses and produces three (3) pulses above the threshold level.

FIG. 8(b) shows the compensated output pulses produced from a small field of view at a high intensity such as when the pen is close to the screen. Again, the compensation circuit provides for essentially three (3) similar pulses to that shown in FIG. 8(a). In order to accomplish the proper compensation, the threshold comparator 36 has its voltage reference level set just below the peak voltage established by the peak detector 44 in the compensation circuitry. The input thereby presented to the comparator 36 is thereby nearly independent of the input light intensity so that the output from the comparator 36 is also nearly independent of input light intensity. The effective field of view of the light pen is thereby decreased by the compensation circuitry because only the light pulses that are at or near the peak intensity detected by the peak detector 44 will be detected by the threshold comparator 36.

FIGS. 9 through 12 illustrate specific circuitry that may be used for the automatic compensated light pen of the present invention. Specifically, FIG. 9 illustrates the photodetector circuitry, FIG. 10 illustrates the amplifier circuitry, FIG. 11 illustrates the comparator circuitry and FIG. 12 illustrates the automatic compensation circuitry. With all of circuitry shown in FIGS. 9 through 12, both the DC and AC characaeristics of the circuitry will be described. The DC characteristics represents the operation of the circuitry prior to the detection of the light pulses and the AC characteristics represents the operation during the detection of the light pulses.

In the photodetector circuitry of FIG. 9 under DC conditions, a transistor 100 is supplied collector current through a resistor 102 and a transistor 104. An emitter follower transistor 106 buffers the collector voltage of transistor 104. The proper base bias on transistors 100 and 104 is maintained using resistors 108, 110 and 112.

A photodetector 114 conducts some current due to ambient light and due to dark current. This current flows into the base of transistor 100 to increases the collector current of transistor 100. Nearly all of the increase in the collector current of transistor 100 also flows through transistor 104 thereby increasing the voltage drop across bias resistor 116. The increased voltage drop across resistor 116 reduces the voltage at the emitter of the transistor 106 which in turn reduces the bias voltage at the base of transistor 100 via the resistors 108, 110 and 112. This reduction in bias voltage tends to return the collector current of transistor 100 to a steady state value. Therefore most of the DC current produced from the photodetector 114 is absorbed by the resistors 108 and 110.

When light strikes the photodetector 114 during AC operation, such as a light pulse of approximately one (1) microsecond, this produces a current pulse into the base of transistor 100 which causes this transistor to sink more collector current for this one (1) microsecond period. Transistors 100 and 104 form a cascode amplifier and a capacitor 118 maintains a constant voltage at the base of transistor 104 during the duration of the pulse. Because of this constant voltage, the emitter voltage of transistor 104 and the collector voltage of transistor 100 tend to remain constant during the duration of the pulse.

Since the collector voltage of the transistor 100 does not change, the current through resistor 102 also does not change and all the increasing current through the transistor 100 flows through transistor 104 and into resistor 116 to produce a negative voltage pulse at the emitter of transistor 106. The resistor 112 isolates this voltage pulse from the capacitor 116 for the duration of the pulse and the pulse is actually formed across a resistor 120 so that the output to the amplifier circuit is taken across the resistor 120.

Neither the base voltage nor the collector voltage of transistor 100 change during the pulse so that the stray capacitance and the collector-base capacitance of the transistor 100 cannot slow down the response of the photodetector of FIG. 9. The gain of the circuit of FIG. 9 is quite high such as −200. The intensity compensation may actually be provided by an input to the base of transistor 106 and the actual intensity compensation signal will be explained with reference to the automatic compensation circuit of FIG. 12.

In the DC operation of the amplifier of FIG. 10, resistors 130 and 132 form a voltage divider that biases the base of transistor 134 so that the voltage at the base of transistor 134 remains constant under DC conditions. The constant voltage at the base of transistor 134 produces a constant voltage across resistor 136 to in turn produce a constant voltage across resistor 138.

During AC operation, the voltage at the base of the transistor 134 is forced low because of a capacitor 140 while the input stage is amplifying the pulse. However, a capacitor 142 maintains the voltage across the resistor 136 constant during the pulse. Therefore the transistor 134 does not conduct as well and the collector current decreases causing a positive pulse at the collector of the transistor 134. The gain from the input to the output of the amplifier circuit of FIG. 10 is approximately −100.

In the DC operation of the comparator circuit of FIG. 11, resistors 150 through 154 form a voltage divider. The inverting input of comparator 158 and the non-inverting input of comparator 160 are connected together and biased at a particular DC voltage through resistor 162. The non-inverting input of comparator 158 is biased slightly higher than its inverting input and the inverting input of comparator 160 is biased even slightly higher than the non-inverting input of comparator 158. As an example, the connection between the inverting input of comparator 158 and the non-inverting input of comparator 160 may be biased at 2 volts. The non-inverting input of comparator 158 may be biased at 2.15 volts and the inverting input of comparator 160 may be biased at 2.2 volts. The output of comparator 158 is normally high and the output of comparator 160 is normally low.

During AC operation, the pulse out of the amplifier of FIG. 10 is coupled to both comparators 158 and 160 through the capacitor 148 shown in FIG. 10. This pulse raises the voltage that is nominally maintained at 2 volts to be 2 volts plus the voltage at the output of the amplifier. If the voltage out of the amplifier exceeds 150 millivolts, then the output of comparator 158 goes low to thereby provide an output signal to the computer. If additionally the voltage out of the amplifier exceeds 200 millivolts, the output of the comparator 160 goes high to thereby provide a comparator signal to the automatic compensation circuit. Each output is a pulse lasting approximately one (1) microsecond.

During DC operation, the automatic compensation circuit of FIG. 12 receives a comparator signal from the comparator 160 of FIG. 11. This comparator signal input is normally low so the emitter voltage of a transistor 170 is also low. This prevents transistor 172 and 174 from turning on which in turn prevents current from flowing through the diode 178. The resistance of the diode 178 and the emitter-base junction of the transistor 174 is therefore high and thus capacitor 180 is effectively open circuited. With everything turned off the compensation circuit essentially has no effect on the DC (or small AC signal) operation of the light pen system.

During AC operation when comparator signal pulses are present from the comparator 160, these pulses are passed through resistor 182 to turn on transistor 170. A charge which had accumulated on capacitor 184 during the DC operation is then transferred to capacitor 186. In addition, a little extra charge is transferred to capacitor 186 through the resistor 188 and the emitter-base junction of the transistor 170. This charge on the capacitor 186 raises the base voltage of transistor 174 so that transistor 174 starts to conduct and pass current through diode 178. The charge is passed to the base of transistor 174 through the voltage divider provided by resistors 190 and 192. With both diode 178 and transistor 170 conducting, some of the detector signal is bypassed through capacitor 194 to ground. The effect of the diode 178 and the transistor 170 at the signal level employed in the circuitry of FIG. 12 is that of a variable resistor.

If the pulses into the comparator 160 of FIG. 11 still exceed 200 millivolts, more charge is transferred to capacitor 186 until the pulses no longer exceed 200 millivolts. When the current through transistor 174 exceeds a predetermined amount, such as 26 microamps, then transistor 172 starts to conduct which turns on transistor 174 even harder and thereby reduces the resistance of the diode 178 and the transistor 174. Therefore, for large amplitude input signals, transistor 174 turns on disproportionately harder because the transistor 172 provides compensation action over a wide range of input light intensity. The resistors 196 and 198 provide for additional biasing.

The present invention therefore provides for an automatic compensation circuit for a light pen to significantly reduce the field of view and light intensity constraints of prior art light pens. The use of the automatic intensity compensation also eliminates the requirement for any manual adjustment such as the sensitivity adjustments typically provided in prior art pens. The automatic compensation circuit uses high gain circuitry to provide for the automatic intensity compensation so that the light pen will operate on high persistance phosphers which are often used in video displays. The automatic intensity compensation also provides for a limitation of a field of view of the light pen and this is accomplished electronically as opposed to prior art structures which have attempted to accomplish this using optical means. The use of the electronic circuitry to provide for the automatic intensity compensation also tends to equalize the response time of the light pen which response time would be typically due to variations in intensity.

Although the invention has been described with reference to a particular embodiment it is to be appreciated that various adaptations and modifications may be made and the invention is only to be limited by the appended claims.

I claim:

1. An automatically compensated light pen for use with a video display monitor incorporating a cathode ray tube, including,
   a detector for detecting light pulses produced by the cathode ray tube when the detector is positioned adjacent the cathode ray tube at a particular desired location and for producing electrical pulses in accordance with the light pulses,
   a variable attenuator having a first input coupled to the output of the detector and responsive to the electrical pulses from the detector for producing variably attenuated electrical pulses and having a second control input responsive to a control signal for controlling the level of the variably attenuated electrical pulses,
   a threshold comparator coupled to the output of the variable attenuator and responsive to the variably attenuated electrical pulses for producing output electrical pulses when the level of the variably attenuated electrical pulses are higher than a particular threshold level for the threshold comparator, and
   a peak detector coupled between the output of the variable comparator and the control input of the variable attenuator and responsive to the variably attenuated electrical pulses for producing a control signal coupled to the control input of the variable attenuator when the level of the variably attenuated electrical pulses are higher than a particular peak level for the peak detector and with the particular threshold level for the threshold comparator less than the particular peak level for the peak detector.

2. The light pen of claim 1 additionally including an amplifier coupled between the variable attenuator and the threshold comparator for amplifying the variably attenuated electrical pulses to a higher level.

3. The light pen of claim 1 additionally including a filter coupled between the variable attenuator and the threshold comparator for filtering out low frequency signals.

4. The light pen of claim 1 wherein the components of the light pen provide for high gain to allow operation with a wide range of types of cathode ray tubes.

5. The light pen of claim 1 wherein the control of the variable attenuator produces a limitation of the field of view by the light pen of the cathode ray tube.

6. The light pen of claim 1 wherein the control of the variable attenuator equalizes the response time of the light pen for variable intensity light outputs from the cathode ray tube.

7. The light pen of claim 1 wherein the control of the variable attenuator eliminates manual sensitivity adjustments to compensate for different types of cathode ray tubes.

8. In a light pen for use with a video display monitor incorporating a cathode ray tube, including, a detector for detecting light pulses produced by the cathode ray tube when the detector is positioned adjacent the cathode ray tube at a particular desired location and for producing electrical pulses in accordance with the light pulses, a threshold comparator coupled to the output of the detector and responsive to the electrical pulses for producing output electrical pulses when the level of the electrical pulses are higher than a particular threshold level for the threshold comparator, the following improvement, a variable attenuator intercoupled between the detector and the threshold comparator and having a first input coupled to the output of the detector and responsive to the electrical pulses from the detector for producing variably attenuated electrical pulses and having a second control input responsive to a control signal for controlling the level of the variably attenuated electrical pulses, and a peak detector coupled between the output of the variable comparator and the control input of the variable attenuator and responsive to the variably attenuated electrical pulses for producing a control signal coupled to the control input of the variable attenuator when the level of the variably attenuated electrical pulses are higher than a particular peak level for the peak detector and with the particular threshold level for the threshold comparator less than the particular peak level for the peak detector.

9. In the light pen of claim 8 wherein an amplifier is coupled between the variable attenuator and the threshold comparator for amplifying the variably attenuated electrical pulses to a higher level.

10. In the light pen of claim 9 a filter is coupled between the amplifier and the threshold comparator for filtering out low frequency signals.

11. In the light pen of claim 8 wherein the components of the light pen provide for high gain to allow operation with a wide range of types of cathode ray tubes.

12. In the light pen of claim 8 wherein the control of the variable attenuator produces a limitation of the field of view by the light pen of the cathode ray tube.

13. In the light pen of claim 8 wherein the control of the variable attenuator equalizes the response time of the light pen for variable intensity light outputs from the cathode ray tube.

14. In the light pen of claim 8 wherein the control of the variable attenuator eliminates manual sensitivity adjustments to compensate for different types of cathode ray tubes.

15. A method of automatically compensating a light pen for use with a video display monitor incorporating a cathode ray tube, including the following steps, detecting light pulses produced by the cathode ray tube from a particular desired location and producing electrical pulses in accordance with the light pulses, variably attenuating the electrical pulses with a control signal to control the level of the variably attenuated electrical pulses, comparing variably attenuated electrical pulses to a particular threshold level to produce output electrical pulses when the level of the variably attenuated electrical pulses are higher than the particular threshold level, and providing a peak detection of the variably attenuated electrical pulses to produce a control signal to control the level of the variably attenuated pulses when the level of the variably attenuated electrical pulses are higher than a particular peak detection level and with the particular threshold level less than the particular peak detection level.

16. The method of claim 15 additionally including the step of amplifying the variably attenuated electrical pulses to a higher level.

17. The method of claim 15 additionally including the step of filtering out low frequency signals from the variably attenuated electrical pulses.

18. The method of claim 15 wherein the step of controlling the variable attenuation produces a limitation of the field of view by the light pen of the cathode ray tube.

19. The method of claim 15 wherein the step of controlling the variable attenuation equalizes the response time of the light pen for variable intensity light outputs from the cathode ray tube.

20. The method of claim 15 wherein the step of controlling the variable attenuation eliminates manual sensitivity adjustments to compensate for different types of cathode ray tubes.

* * * * *